United States Patent
Spittael et al.

(10) Patent No.: US 7,584,623 B2
(45) Date of Patent: Sep. 8, 2009

(54) DEVICE FOR SUPPLYING FUEL TO AN ENERGY PRODUCTION INSTALLATION OF A SHIP

(75) Inventors: Laurent Spittael, Montigny-les-Bretonneux (FR); Pascal Raynaud, Elancourt (FR); Jacques Dhellemmes, Versailles (FR)

(73) Assignee: Gaztransport et Technigaz, Saint-Remy-les-Chevreuse (FR)

( * ) Notice: Subject to any disclaimer, the term of this patent is extended or adjusted under 35 U.S.C. 154(b) by 639 days.

(21) Appl. No.: 11/231,766

(22) Filed: Sep. 22, 2005

(65) Prior Publication Data

US 2006/0086412 A1 Apr. 27, 2006

(30) Foreign Application Priority Data

Oct. 27, 2004 (FR) .................................. 04 11437

(51) Int. Cl.
*F17C 9/04* (2006.01)
*F02M 37/00* (2006.01)

(52) U.S. Cl. .................. 62/50.3; 123/514; 62/50.1; 62/50.2; 440/88 F

(58) Field of Classification Search .................. 141/67, 141/98; 137/263; 62/50.1, 50.2, 50.3, 50.4; 440/88 F; 123/509–514
See application file for complete search history.

(56) References Cited

U.S. PATENT DOCUMENTS

| | | | |
|---|---|---|---|
| 2,061,013 A | | 11/1936 | Wade et al. |
| 3,128,709 A | | 4/1964 | Arkless et al. |
| 3,210,953 A | * | 10/1965 | Reed ........................... 62/48.2 |
| 4,100,758 A | * | 7/1978 | Mayer ......................... 62/47.1 |
| 4,860,714 A | * | 8/1989 | Bucci .......................... 123/514 |
| 5,360,139 A | * | 11/1994 | Goode .......................... 222/40 |
| 5,537,828 A | * | 7/1996 | Borcuch et al. ............... 62/50.1 |

FOREIGN PATENT DOCUMENTS

| | | |
|---|---|---|
| FR | 639524 | 6/1928 |
| FR | 2 832 783 A | 5/2003 |
| FR | 2 837 783 A | 10/2003 |
| GB | 853077 | 11/1960 |

OTHER PUBLICATIONS

Search report in corresponding ES 200502450 Dec. 16, 2008.

* cited by examiner

*Primary Examiner*—Timothy L Maust
(74) *Attorney, Agent, or Firm*—Young & Thompson

(57) ABSTRACT

A device for supplying fuel to an onboard energy production installation (5) on a liquefied gas transport ship (1) from at least one liquefied gas tank (2) of the ship includes a liquid ejector (12) arranged in the tank in order to suck liquefied gas at the level of the bottom of the tank, a circulating pump (20) arranged above the tank, a liquid circuit (21, 22, 23, 24) connecting an outlet of the circulating pump to an inlet of the liquid ejector and an outlet of the liquid ejector to an inlet of the circulating pump to permit the closed-loop circulation of a stream of liquefied gas through the liquid ejector, and a feed line (28) connecting the liquid circuit to the energy production installation.

6 Claims, 4 Drawing Sheets

DEVICE FOR SUPPLYING FUEL TO AN ENERGY PRODUCTION INSTALLATION OF A SHIP

Figure 1:
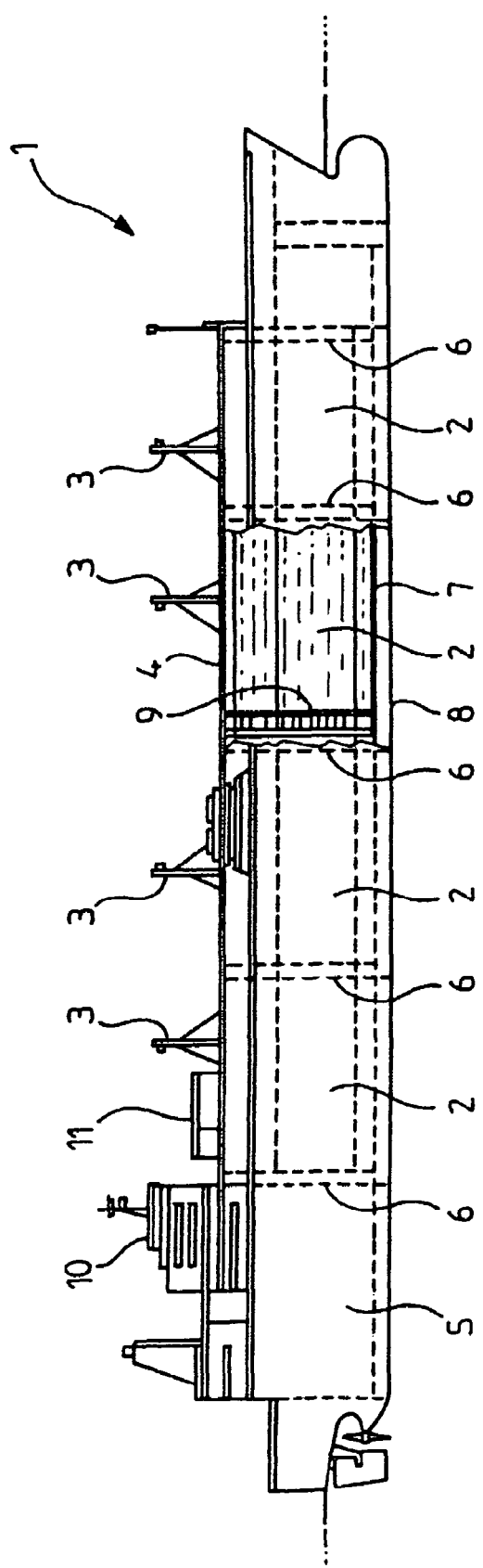

The present invention relates to a device for supplying fuel to an onboard energy production installation on a liquefied gas transport ship from a liquefied gas tank of the said ship.

In a liquefied gas transport ship, for example such as an LNG tanker, an energy production installation is provided to supply the energy needs for running the ship, particularly for the propulsion of the ship and/or the generation of electricity for the onboard equipment. Such an installation commonly comprises heat engines consuming gas from an evaporator that is supplied from the cargo of liquefied gas transported in the ship's holds.

FR-A-2837783 provides for supplying such an evaporator using a submersible pump at the bottom of a hold of the ship. A pump placed in this way has drawbacks in supplying the propulsion of an LNG tanker with gas during a voyage on ballast, that is, when the holds have been unloaded. In this case, it is necessary to leave on the bottom of the holds a residue of liquefied gas sufficient to operate of the pump. In fact, if the liquid level is too low, the pump is sometimes forced to pump a mixture of liquid and gas because of the movements of the cargo, incurring the risk of unpriming or seriously damaging the pump (poor cooling, lower power, etc.).

FR-A-2832783 proposes to avoid these problems by surrounding the pump, still placed on the bottom of the hold, with a collecting chamber equipped with nonreturn valves, ensuring continuous immersion of the pump suction even when the hold is slightly filled and the ship is subjected to pitch and roll movements. However, the drawback remains that a centrifugal pump placed on the bottom of a ship's hold is relatively inaccessible and requires prolonged technical shutdowns for its maintenance.

It is the object of the present invention to provide a feed device allowing simpler maintenance. A further object of the invention is to provide a feed device that operates correctly with a low liquid level in the hold.

For this purpose, the invention provides a device for supplying fuel to an onboard energy production installation on a liquefied gas transport ship from at least one liquefied gas tank of the said ship, characterized by the fact that the said device comprises:

a liquid ejector arranged in the said tank in order to suck liquefied gas at the level of the bottom of the said tank,
a circulating pump arranged above the said tank,
a liquid circuit connecting an outlet of the said circulating pump to an inlet of the said liquid ejector and an outlet of the said liquid ejector to an inlet of the said circulating pump to permit the closed-loop circulation of a stream of liquefied gas through the said liquid ejector,
and a feed line connecting the said liquid circuit to the said energy production installation.

Within the context of the invention, a liquid ejector, also called a liquid jet pump, denotes a type of pump comprising a nozzle in which the powerful force of a stream of liquid injected under pressure causes suction of the liquid which reaches the periphery of the nozzle. Such an ejector has many advantageous features:

absence of mechanical moving parts, hence easy and very reliable installation,
little or no maintenance requiring a technical shutdown of the ship,
possibility of suction with a lower liquid level than a conventional pump, implying the possibility of unloading more liquid at the ship unloading terminal,
possibility of no-load operation (without liquid to be sucked) without the risk of damage or unpriming.

Advantageously, an auxiliary tank is provided, placed above the said hold and connectable to the said liquid circuit. Preferably, the said auxiliary tank is able to contain a volume of liquefied gas at least sufficient to fill the said liquid circuit and to prime the said circulating pump.

Preferably, the said auxiliary tank is a buffer tank inserted in the said liquid circuit between the said outlet of the liquid ejector and the said inlet of the circulating pump. Such a tank enables the liquid ejector to emerge temporarily without affecting the operation of the pump.

Advantageously, the said liquid circuit comprises a control valve inserted between the said outlet of the circulating pump and the said inlet of the ejector, the said valve being actuated according to the liquid level in the said buffer tank.

Advantageously, the said feed line is connected to the said liquid circuit between the said outlet of the circulating pump and the said control valve.

According to a particular embodiment, the said feed line is connected to the said liquid circuit at the level of the said buffer tank, the said feed line being equipped with a discharge pump separate from the circulating pump to discharge liquid from the said buffer tank to the said energy production installation.

Preferably, a return line is provided, connecting the said feed line to the said buffer tank, the said return line being equipped with a control valve actuated according to the pressure in the said feed line.

According to another particular embodiment, the said auxiliary tank is located outside the said liquid circuit and is connectable thereto via a valve.

Advantageously, the said liquid circuit comprises a control valve inserted between the said outlet of the circulating pump and the said inlet of the ejector, the said feed line being connected to the said liquid circuit between the said outlet of the circulating pump and the said control valve, the said feed line being equipped with a flow gage to actuate the said valve according to the liquid flow rate measured in the said feed line.

Preferably, a return line is provided, connecting the said feed line to the said tank, the said return line being equipped with a control valve actuated according to the pressure in the said feed line.

Preferably, a filling line is provided, connecting the outlet of a discharge pump of the said tank to the said auxiliary tank.

Preferably, the said auxiliary tank is connected to a vapor manifold of the said ship by a link equipped with a valve for controlling the pressure in the auxiliary tank.

Advantageously, the said auxiliary tank is equipped with a safety valve at the level of its upper wall to relieve the overpressures above a preset threshold.

Preferably, the said circulating pump and the said auxiliary tank are placed on the upper deck of the said ship.

According to a particular embodiment, the said liquid ejector is fixed to a guide member arranged on a bottom wall of the said tank to guide the lower end of an unloading tower of the said tank.

Preferably, the said feed line is equipped with a valve actuated by a demand signal from the said energy production installation to regulate the feed of the said installation.

Preferably, the said feed line terminates in a vaporizer able to vaporize the liquefied gas conveyed from the said liquid circuit through the said feed line.

Preferably, the said tank, the said circulating pump and the said liquid circuit are thermally insulated.

Figure 2:
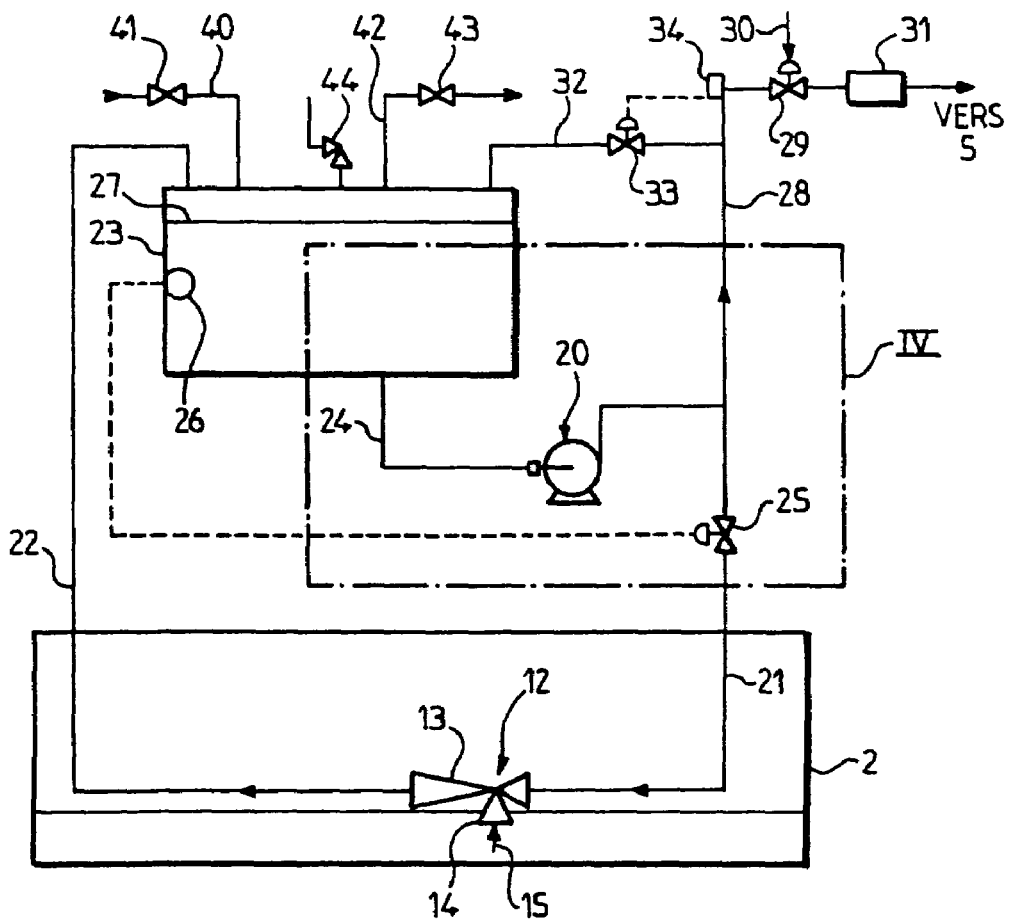
Figure 4:
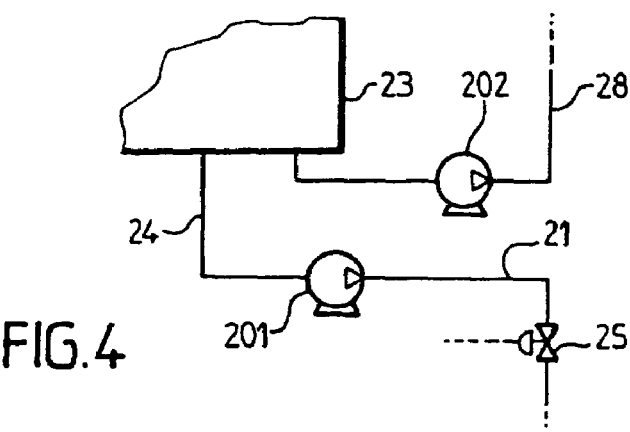
Figure 3:
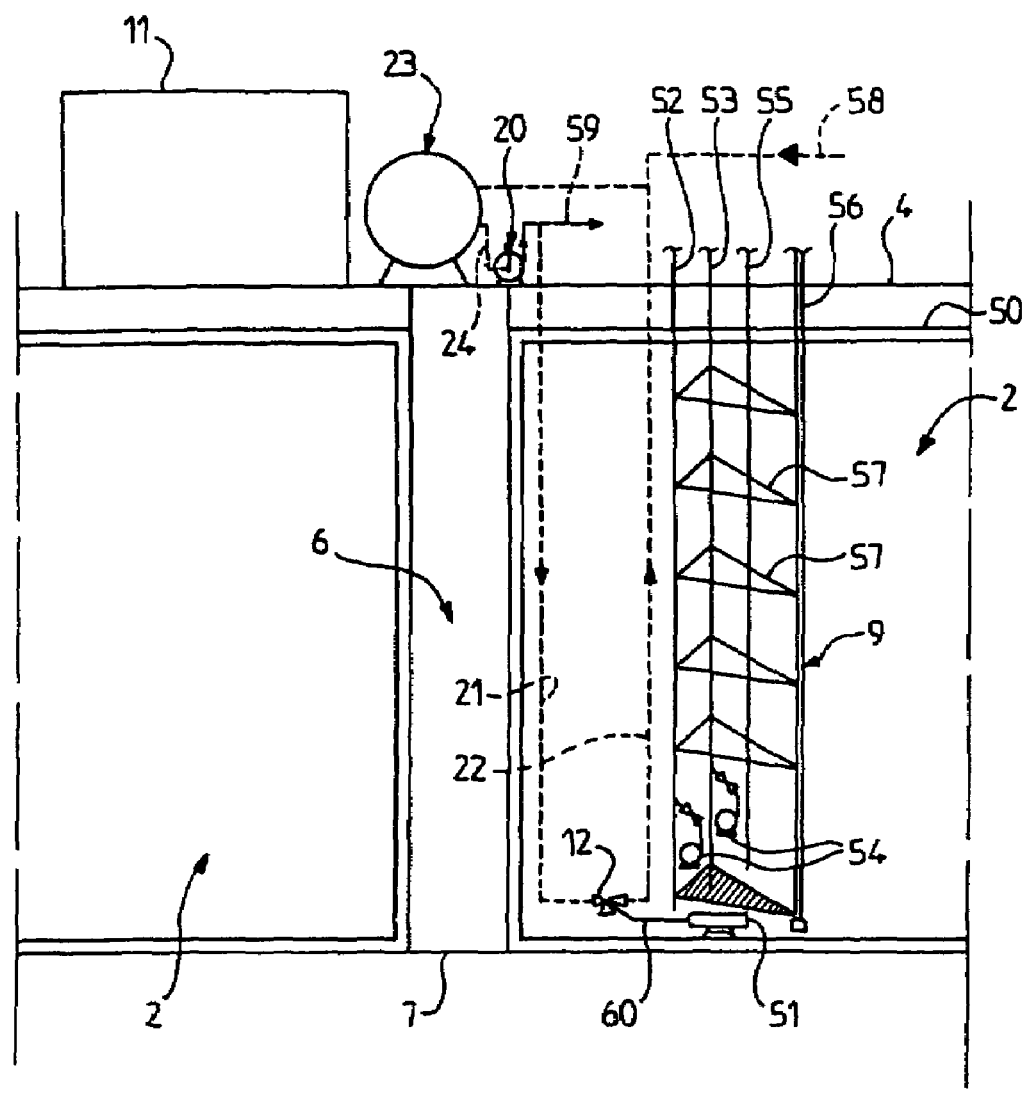
Figure 5:
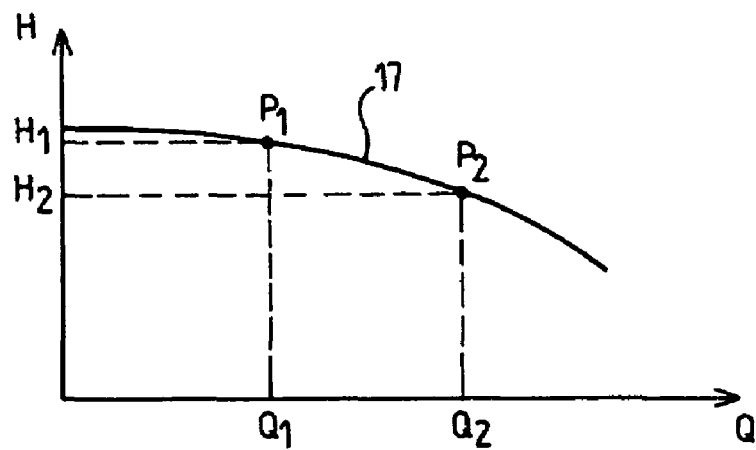
Figure 6:
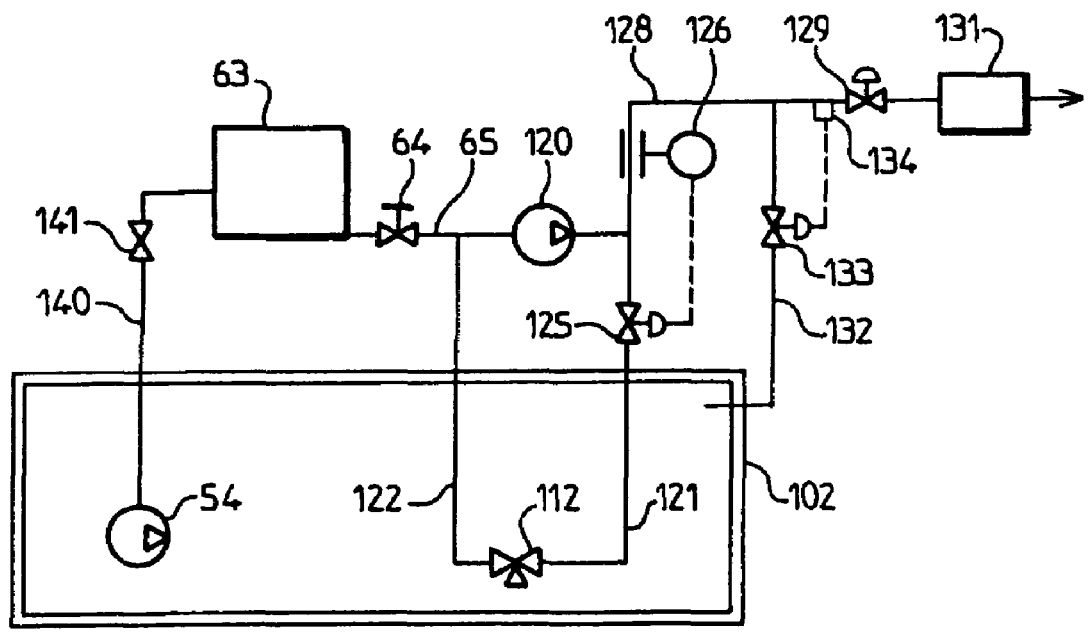

The invention will be better understood, and other aims, details, features and advantages thereof will appear more clearly from the following description of several particular embodiments of the invention, provided only for non-limiting illustration, with reference to the drawings appended hereto. In these drawings:

FIG. 1 is a side view of an LNG tanker that can be equipped with the device according to the invention, FIG. 2 is a functional diagram of a feed device according to a first embodiment of the invention, FIG. 3 is a partial side cross sectional view of an LNG tanker equipped with the device of FIG. 2, FIG. 4 is a detailed view of section IV of FIG. 2 illustrating a variant of the feed device, FIG. 5 shows the operating curve of a circulating pump of the device of FIG. 2, FIG. 6 is a functional diagram of a feed device according to a second embodiment of the invention.

FIG. 1 shows an LNG tanker 1 with a conventional overall structure. This ship comprises holds 2, numbering four for example, sealed and thermally insulated for the storage of a cargo of liquefied gas, for example a high methane gas, at about −160° C. Each hold is associated with a mast 3 that is placed on the upper deck 4 of the ship for exhausting the gas during an overpressure in the corresponding hold 2. At the stern of the ship 1, a machine compartment 5 is provided, comprising heat engines operating by combustion of gas issuing from the holds 2, for example steam boilers serving to feed steam turbines for the propulsion of the ship and/or the generation of electricity.

The holds 2 are separated from one another by athwartship bulkheads 6 known by the term of "cofferdam". The bottom of each hold is formed by the inner side 7 of the double hull of the ship. The space between the inner side 7 and the outer side 8 of the double hull serves as ballast that can be filled with seawater, particularly to stabilize the ship when the holds 2 are unloaded. Each hold 2 also comprises a loading/unloading tower 9 to load the cargo in the tank before its transport and to unload the cargo after its transport. The towers 9 are described in further detail below. In front of the aft superstructure 10 of the ship is a room 11 called the auxiliary room that contains equipment used to transport the fluids on board during the loading, unloading of the cargo, and the inerting of the holds, that is, equipment such as compressors, heaters, heat exchangers, etc.

When the ship sails with its holds full, the natural evaporation of gas in the holds 2 generally produces a large quantity of fuel for the operation of the machines in the engine room 5. Conventionally, these evaporation gases are collected by a vapor manifold, not shown in FIG. 1, circulating on the upper deck of the ship. However, when the ship sails on ballast, that is, after its holds have been unloaded, it is necessary to pump the remaining heel of liquefied gas in one or more of the holds 2 to supply the ship's propulsion system, and the ship is accordingly equipped with a feed device as shown in FIG. 2.

This feed device comprises a liquid ejector 12 arranged on the bottom of a hold 2. Such a liquid ejector is well known to a person skilled in the art, so that there is no need to provide a detailed description thereof. It roughly comprises a convergent/divergent nozzle 13 through which a stream of liquid is caused to flow, serving as a drive stream. It also comprises a suction tube 14 directed toward the bottom of the tank and which terminates laterally in the nozzle 13. The drive stream in the nozzle 13 causes suction of liquefied gas through the suction tube 14 as shown by the arrow 15. To create the drive stream, a cryogenic pump 20 is provided, of which the outlet is connected via a line 21 to the inlet of the nozzle 13 of the ejector. A line 22 connects the outlet of the nozzle 13 to a buffer tank 23, for example with a volume of about 10 m³ or more, serving to temporarily store the liquid ejected by the ejector 12 from the hold 2. A line 24 connects the buffer tank 23 to the inlet of the cryogenic pump 20. The lines 21, 22, 24 and the buffer tank 23 thereby form a liquid circuit that permits the closed-loop circulation of a drive stream through the ejector 12.

A control valve 25 is mounted on the line 21 between the outlet of the pump 20 and the inlet of the ejector 12 to regulate the flow of drive liquid in the line 21. The opening of the valve 25 is automatically regulated according to the measurement indication of a level gage 26 placed in the tank 23 and sensitive to the liquid level therein. Thus, the valve 25 is opened when the level in the tank 23 drops and, on the contrary, the valve 25 is closed when this level rises. This regulation prevents the liquid level in the tank 23, which is shown by the line 27, from falling below a certain threshold, that is liable to cause the unpriming of the pump 20 and its damage. In operation, the tank 23 constitutes a liquid reserve that serves to ensure a continuous inlet flow into the pump 20 even if the ejector 12 is temporarily emerged, for example because of cargo movements due to the swell, so that the flow of liquefied gas leaving the ejector 12 is nonuniform. The presence of the buffer tank 23 hence serves to further lower the filling level of the hold 2 at which a feed of the machines is made possible. The ejector is in fact capable of operating intermittently, that is, of collecting the wave of liquefied gas that moves to and fro at the bottom of the hold upon each passage at the level of the ejector.

A feed line 28 is connected to the line 21 between the outlet of the pump 20 and the valve 25. The feed line 28 serves to convey a part of the liquefied gas flowing in the line 21 toward the energy production installation to be supplied. To regulate the flow leaving through the feed line 28, the line is provided with a flow control valve 29 of which the opening and closing are actuated according to the consumption of the machines, using a demand signal shown by the arrow 30 issuing from a device for controlling the heat engines in the engine room 5. Downstream of the valve 29, the feed line 28 terminates in a vaporizer 31 serving to vaporize the liquefied gas to supply it in gaseous form to the machines to be supplied. A return line 32 is connected to the feed line 28 upstream of the valve 29 and terminates in the buffer tank 23. The return line 32 permits the return of liquefied gas to the buffer tank 23 when the pressure in the feed line 28 is too high. For this purpose, the line 32 is equipped with a control valve 33 regulated according to the measurement indication of a pressure gage 34 measuring the pressure in the line 28. In operation, the pressure downstream of the pump 20 is controlled by the various valves 25, 29 and 33. FIG. 5 shows the operating characteristic 17 of the pump 20. On the y-axis in FIG. 5, H represents the pressure difference between the inlet and outlet of the pump 20 and, on the x-axis, Q represents the flow discharged by the pump 20. The pump 20 is pressure regulated. From an operating point $P_1$ characterized by a pressure difference $H_1$ and a flow rate $Q_1$, the flow can be increased to a level $Q_2$ corresponding to the operating point $P_2$ by decreasing the pressure difference to the level $H_2$. This explains why the opening and closing of the valves 25 and 29 enables simple control of the flow rate discharged by the pump 20.

To initiate the feed device, it may be necessary to fill the buffer tank 23 by a means other than the liquid ejector 12. For this purpose, the tank 23 is equipped with a filling line 40 provided with a control valve 21 and connected to the unloading circuit of the holds 2, thereby serving to fill the buffer tank 23 during the unloading of the ship. A line 42 starting from the upper wall of the buffer tank 23 and equipped with an equalizing valve 43 serves to send the evaporation gas appearing in the tank 23 to the general vapor manifold of the LNG tanker, not shown. The valve 43 serves to control the pressure in the buffer tank 23. In operation, the valve 43 normally remains open so that the pressure in the buffer tank 23 is substantially equal to the pressure in the ship's holds, that is, close to the standard pressure. Moreover, a safety valve 43 serves to guarantee an additional level of safety against any risk of pressure buildup in the buffer tank 23.

In the feed device in FIG. 2, the buffer tank 23 and the circulating pump 20 are preferably placed above the hold 2 in which the liquid ejector 12 is placed. FIG. 3 shows a more precise example of the layout of the feed device in FIG. 2 on an LNG tanker. In this example, the buffer tank 23 and the feed pump 20 are placed on the upper deck 4 of the ship, for example just in front of the auxiliary room 11. The liquid ejector 12 is fixed in the hold 2, as close as possible to the bottom of this hold and at the back thereof. To fix the ejector, it is advantageous to use the existing structure of the hold loading/unloading tower 9.

The tower 9 extends along the entire height of the hold 2 in the neighborhood of an athwartship bulkhead 6 and is suspended from the upper wall 50 of the hold 2. The tower 9 has vertical freedom of movement and is accordingly guided at the level of its lower end by a guide member 51 that is fixed to the bottom wall of the hold 2. More precisely, the loading/unloading tower 9 comprises two unloading pipes 52 and 53 both equipped at their base with a link to a respective unloading pump 54. The tower 9 also comprises a filling tube 55 and a larger diameter tube 56 serving as a standby shaft through which a standby pump can be lowered to the bottom of the hold in case of failure of one of the pumps 54. Finally, the tower 9 comprises a plurality of horizontal platforms 57 that are connected by ladders, not shown, and which permit the lowering of a man to the bottom of the hold. In the layout example shown in FIG. 3, the liquid ejector 12 is fixed to the guide member 51 by a bracket 60 that extends towards the stern of the ship.

The device described serves to supply fuel from one or more of the ship's holds 2. In the latter case, a liquid ejector 12 is similarly placed in each of the holds used. It is possible to use a single buffer storage tank 23 and a single circulating pump 20 in common for all the ejectors. In this case, with reference to FIG. 3, the inlets of the various liquid ejectors are connected to the outlet of the circulating pump 20 on a bypass in relation to one another, as indicated by the line 59. Similarly, the outlets of the various liquid ejectors are connected to the inlet of the buffer tank 23 on a bypass with respect to one another, as shown by the line 58. As a variant, it is also possible to use one circulating pump for each ejector and/or one buffer tank for each ejector, or even one distinct complete feed device for each of the holds.

In the embodiment shown in FIG. 2, the circulating pump 20 performs the two functions of circulating a drive stream through the liquid ejector 12 and of discharging liquid into the feed line 28 toward the energy production installation to be supplied. This configuration is particularly advantageous when the pressure level required for these two functions is similar. The embodiment in FIG. 2 can also operate when the pressure required in the liquid ejector 12 is significantly different from the pressure required in the feed line 28, but this situation implies artificially creating pressure drops in the line 21 or in the feed line 28, which is not optimal for the energy efficiency of the feed device.

In the case in which a different pressure is required at the inlet of the liquid ejector 12 and in the feed line 28, it is possible as a variant to use the device shown partially in FIG. 4, that is, two separate pumps in place of the pump 20. In FIG. 4, the same reference numerals designate identical elements to those in FIG. 2. The pump 201 ensures the production of a drive stream through the liquid ejector 12, while the pump 202 ensures the discharge of liquefied gas through the feed line 28 directly from the tank 23.

In another variant, the pump 20 in FIG. 2 can be replaced with several pumps connected in parallel between the lines 24 and 21. Such a configuration serves to have at least one standby pump in case of the failure of a circulating pump.

With reference to FIG. 6, a second embodiment of the feed device is now described. The similar or identical elements to those of the first embodiment have the same reference numeral, plus the number 100. In the rest of the text, this second embodiment is therefore only described for its differences with the first embodiment.

Here, the buffer tank is eliminated and the line 122 directly connects the outlet of the ejector 112 to the inlet of the circulating pump 120. Instead of a level gage, a flowmeter 126 is used to actuate the opening and closing of the control valve 125, the flowmeter 126 being arranged in order to measure the flow rate through the feed line 128, which is connected in the same way as the feed line 28 in FIG. 2. As to the return line 132, it terminates in the storage tank 102 instead of the buffer tank.

To ensure the priming of the liquid circuit and of the pump 20, in this case, an auxiliary tank 63 is provided, also placed above the hold and connected to the line 122 upstream of the pump 120 via a connecting line 65 equipped with a shutoff valve 64. For its filling, the auxiliary tank 63 is advantageously equipped with a filling line 140 provided with a valve 141 that connects the auxiliary tank 63 to an unloading pump 54 of the tower 9 to permit the filling of the tank 63 during the unloading of the ship's holds. For this purpose, a pump distinct from the unloading pumps 54 could also be used. Like the buffer tank 23, the auxiliary tank 63 can also be equipped with a connecting line to the vapor manifold of the ship with a corresponding equalizing valve and a safety valve, neither of which is shown. The tank 63 must serve to prime or reprime the circulating pump 120 at any time. For this purpose, its volume must be at least equal to the volume of the circuit formed by the elements 120, 121 and 122.

As an example, the ejector 12/112 can be dimensioned so as to obtain a suction flow of about 8 $m^3/h$, or about 3 to 4 t/h depending on the density of the liquefied gas. For a 40 m high hold, this can be obtained with a drive stream of about 12.5 $m^3/h$ at an absolute pressure of 0.7 to 0.8 MPa at the inlet and about 0.3 MPa at the outlet of the ejector. For this purpose, the pump 20/120/201 can be dimensioned, for example, to supply a nominal flow rate of 20 $m^3/h$.

Although the invention has been described in relation to several particular embodiments, it is quite clear that it is in no way limited thereto and that it comprises all the technical equivalents of the means described as well as their combinations if the latter fall within the scope of the invention.

The invention claimed is:

1. Device for supplying fuel to an onboard energy production installation (5) on a liquefied gas transport ship (1) from at least one liquefied gas tank (2) of the said ship, characterized by the fact that the said device comprises:
 a liquid ejector (12, 112) arranged in the said tank in order to suck liquefied gas at the level of the bottom of the said tank, a circulating pump (20, 120, 201) arranged above the said tank, a liquid circuit (21, 22, 23, 24; 121, 122) connecting an outlet of the said circulating pump to an inlet of the said liquid ejector and an outlet of the said liquid ejector to an inlet of the said circulating pump to permit the closed-loop circulation of a stream of liquefied gas through the said liquid ejector, a feed line (28, 128) connecting the said liquid circuit to the said energy production installation, wherein the said auxiliary tank is a buffer tank (23) inserted in the said liquid circuit (21-24) between the said outlet of the liquid ejector (12) and the said inlet of the circulating pump (20, 201), and a return line (32) connecting the said feed line (28) to the said buffer tank (23), the said return line being equipped with a control valve (33) actuated according to the pressure in the said feed line.

2. Device for supplying fuel to an onboard energy production installation (5) on a liquefied gas transport ship (1) from at least one liquefied gas tank (2) of the said ship, characterized by the fact that the said device comprises:

a liquid ejector (12, 112) arranged in the said tank in order to suck liquefied gas at the level of the bottom of the said tank, a circulating pump (20, 120, 201) arranged above the said tank, a liquid circuit (21, 22, 23, 24; 121, 122) connecting an outlet of the said circulating pump to an inlet of the said liquid ejector and an outlet of the said liquid ejector to an inlet of the said circulating pump to permit the closed-loop circulation of a stream of liquefied gas through the said liquid ejector, a feed line (28, 128) connecting the said liquid circuit to the said energy production installation, an auxiliary tank (23, 63) placed above the said tank (2) and connectable to the said liquid circuit (21, 22, 23, 24; 121, 122), the said tank being able to contain a volume of liquefied gas at least sufficient to fill the said liquid circuit and to prime the said circulating pump (20, 120, 201), said auxiliary tank (23, 63) being connected to a vapor manifold of the said ship by a link (42) equipped with a valve (43) for controlling the pressure in the auxiliary tank.

3. Device for supplying fuel to an onboard energy production installation (5) on a liquefied gas transport ship (1) from at least one liquefied gas tank (2) of the said ship, characterized by the fact that the said device comprises:

a liquid ejector (12, 112) arranged in the said tank in order to suck liquefied gas at the level of the bottom of the said tank, a circulating pump (20, 120, 201) arranged above the said tank, a liquid circuit (21, 22, 23, 24; 121, 122) connecting an outlet of the said circulating pump to an inlet of the said liquid ejector and an outlet of the said liquid ejector to an inlet of the said circulating pump to permit the closed-loop circulation of a stream of liquefied gas through the said liquid ejector, a feed line (28, 128) connecting the said liquid circuit to the said energy production installation, said liquid ejector (12, 112) being fixed to a guide member (51) arranged on a bottom wall of the said tank to guide the lower end of an unloading tower (9) of the said tank.

4. Device for supplying fuel to an onboard energy production installation (5) on a liquefied gas transport ship (1) from at least one liquefied gas tank (2) of the said ship, characterized by the fact that the said device comprises:

a liquid ejector (12, 112) arranged in the said tank in order to suck liquefied gas at the level of the bottom of the said tank, a circulating pump (20, 120, 201) arranged above the said tank, a liquid circuit (21, 22, 23, 24; 121, 122) connecting an outlet of the said circulating pump to an inlet of the said liquid ejector and an outlet of the said liquid ejector to an inlet of the said circulating pump to permit the closed-loop circulation of a stream of liquefied gas through the said liquid ejector, a feed line (28, 128) connecting the said liquid circuit to the said energy production installation, said feed line (28, 128) being equipped with a valve (29, 129) actuated by a demand signal (30) from the said energy production installation to regulate the feed of the said installation.

5. Device for supplying fuel to an onboard energy production installation (5) on a liquefied gas transport ship (1) from at least one liquefied gas tank (2) of the said ship, characterized by the fact that the said device comprises:

a liquid ejector (12, 112) arranged in the said tank in order to suck liquefied gas at the level of the bottom of the said tank, a circulating pump (20, 120, 201) arranged above the said tank, a liquid circuit (21, 22, 23, 24; 121, 122) connecting an outlet of the said circulating pump to an inlet of the said liquid ejector and an outlet of the said liquid ejector to an inlet of the said circulating pump to permit the closed-loop circulation of a stream of liquefied gas through the said liquid ejector, a feed line (28, 128) connecting the said liquid circuit to the said energy production installation, said feed line terminating in a vaporizer (31, 131) able to vaporize the liquefied gas conveyed from the said liquid circuit through the said feed line.

6. Device for supplying fuel to an onboard energy production installation (5) on a liquefied gas transport ship (1) from at least one liquefied gas tank (2) of the said ship, characterized by the fact that the said device comprises:

a liquid ejector (12, 112) arranged in the said tank in order to suck liquefied gas at the level of the bottom of the said tank, a circulating pump (20, 120, 201) arranged above the said tank, a liquid circuit (21, 22, 23, 24; 121, 122) connecting an outlet of the said circulating pump to an inlet of the said liquid ejector and an outlet of the said liquid ejector to an inlet of the said circulating pump to permit the closed-loop circulation of a stream of liquefied gas through the said liquid ejector, a feed line (28, 128) connecting the said liquid circuit to the said energy production installation, said liquid circuit comprising a control valve (25) inserted between the said outlet of the circulating pump and the said inlet of the ejector, the said valve being actuated according to the liquid level in the said buffer tank (23), and a return line (32) connecting the said feed line (28) to the said buffer tank (23), the said return line being equipped with a control valve (33) actuated according to the pressure in the said feed line.

* * * * *

UNITED STATES PATENT AND TRADEMARK OFFICE
CERTIFICATE OF CORRECTION

PATENT NO. : 7,584,623 B2 Page 1 of 1
APPLICATION NO. : 11/231766
DATED : September 8, 2009
INVENTOR(S) : Spittael et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 983 days.

Signed and Sealed this

Fourteenth Day of September, 2010

David J. Kappos
*Director of the United States Patent and Trademark Office*